US010750589B2

(12) United States Patent
Spinivasamurthy et al.

(10) Patent No.: US 10,750,589 B2
(45) Date of Patent: Aug. 18, 2020

(54) EXTERIOR AIRCRAFT LIGHT UNIT AND AIRCRAFT COMPRISING THE SAME

(71) Applicant: Goodrich Lighting Systems GmbH, Lippstadt (DE)

(72) Inventors: Ramesh Spinivasamurthy, Lippstadt (DE); Andre Hessling-Von Heimendahl, Koblenz (DE); Robert Trinschek, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/167,632

(22) Filed: Oct. 23, 2018

(65) Prior Publication Data

US 2019/0124739 A1  Apr. 25, 2019

(30) Foreign Application Priority Data

Oct. 23, 2017 (EP) ..................... 17197744

(51) Int. Cl.

| H05B 45/14 | (2020.01) |
|---|---|
| B64D 47/06 | (2006.01) |
| B64D 47/04 | (2006.01) |
| H02H 3/08 | (2006.01) |
| H05B 45/00 | (2020.01) |
| F21W 107/30 | (2018.01) |
| B64D 47/02 | (2006.01) |

(52) U.S. Cl.
CPC ............ *H05B 45/14* (2020.01); *B64D 47/04* (2013.01); *B64D 47/06* (2013.01); *H02H 3/085* (2013.01); *H05B 45/00* (2020.01); *B64D 47/02* (2013.01); *F21W 2107/30* (2018.01)

(58) Field of Classification Search
None
See application file for complete search history.

(56) References Cited

U.S. PATENT DOCUMENTS

| 6,400,101 | B1 | 6/2002 | Biebl et al. | |
|---|---|---|---|---|
| 7,777,421 | B2 | 8/2010 | Mishimagi | |
| 7,825,600 | B2 * | 11/2010 | Stam ..................... | B60Q 1/085 |
| | | | | 315/82 |
| 8,410,717 | B2 * | 4/2013 | Shteynberg .......... | H05B 45/395 |
| | | | | 315/291 |
| 8,450,948 | B2 | 5/2013 | Huang et al. | |
| 8,851,718 | B2 * | 10/2014 | Jha ........................ | B64D 47/06 |
| | | | | 362/241 |

(Continued)

FOREIGN PATENT DOCUMENTS

| DE | 102014008614 A1 | 12/2015 | |
|---|---|---|---|
| EP | 2073607 A1 | 6/2009 | |
| WO | WO-2017190981 A1 * | 11/2017 | .......... H05B 33/086 |

OTHER PUBLICATIONS

Extended European Search Report for International Application No. 17197744.0 dated Apr. 17, 2018, 7 pages.

*Primary Examiner* — Amy Cohen Johnson
*Assistant Examiner* — Srinivas Sathiraju
(74) *Attorney, Agent, or Firm* — Cantor Colburn LLP (57) ABSTRACT

An exterior aircraft light unit includes at least two light sources. Each light source is provided with a variable current bypass component. Each variable current bypass component is configured to allow bypassing an adjustable electric current by the respective light source.

12 Claims, 4 Drawing Sheets

(56) References Cited

U.S. PATENT DOCUMENTS

| | | | |
|---|---|---|---|
| 8,970,131 B2* | 3/2015 | Brandes | H05B 45/00 315/299 |
| 8,974,097 B2* | 3/2015 | Hessling | B64D 47/06 362/470 |
| 9,030,103 B2* | 5/2015 | Pickard | H05B 45/20 315/152 |
| 9,039,746 B2* | 5/2015 | van de Ven | H05B 45/20 607/88 |
| 9,061,772 B1* | 6/2015 | Hartwell | B64D 47/06 |
| 9,101,021 B2* | 8/2015 | Lys | H05B 45/48 |
| 9,295,114 B2* | 3/2016 | Trinschek | H05B 45/37 |
| 9,538,590 B2* | 1/2017 | Hussell | F21V 29/70 |
| 9,694,913 B2* | 7/2017 | Menne | B64D 47/02 |
| 9,723,677 B2* | 8/2017 | Hessling-Von Heimendahl | H05B 47/11 |
| 9,919,810 B2* | 3/2018 | Hessling von Heimendahl | B64D 47/04 |
| 10,098,197 B2* | 10/2018 | van de Ven | H05B 45/24 |
| 10,189,579 B2* | 1/2019 | Hessling-von Heimendahl | F21S 41/663 |
| 10,299,343 B2* | 5/2019 | Klein | H05B 47/20 |
| 2010/0308738 A1* | 12/2010 | Shteynberg | H05B 45/48 315/185 R |
| 2012/0306370 A1* | 12/2012 | Van De Ven | H05B 45/24 315/113 |
| 2014/0225514 A1* | 8/2014 | Pickard | H05B 45/00 315/152 |
| 2014/0228914 A1* | 8/2014 | van de Ven | A61M 21/00 607/88 |
| 2014/0232288 A1* | 8/2014 | Brandes | H05B 47/00 315/250 |
| 2015/0257211 A1* | 9/2015 | Johnson | H05B 45/50 315/121 |
| 2015/0282260 A1* | 10/2015 | Hussell | H01L 25/167 315/51 |
| 2016/0338165 A1 | 11/2016 | Zhai et al. | |
| 2016/0345401 A1* | 11/2016 | Hessling-Von Heimendahl | F21V 5/04 |
| 2016/0345408 A1* | 11/2016 | Schoen | G01S 17/88 |
| 2017/0073083 A1* | 3/2017 | Hessling-von Heimendahl | B64D 47/06 |
| 2017/0233101 A1* | 8/2017 | Hessling-Von Heimendahl | F21V 7/0091 362/470 |
| 2018/0084620 A1* | 3/2018 | Klein | B64D 47/06 |
| 2019/0098723 A1* | 3/2019 | Sadwick | F21K 9/272 |
| 2019/0124739 A1* | 4/2019 | Spinivasamurthy | H02H 5/04 |
| 2019/0193868 A1* | 6/2019 | Trinschek | H05B 45/14 |

* cited by examiner

EXTERIOR AIRCRAFT LIGHT UNIT AND AIRCRAFT COMPRISING THE SAME

FOREIGN PRIORITY

This application claims priority to European Patent Application No. 17197744.0 filed Oct. 23, 2017, the entire contents of which is incorporated herein by reference

BACKGROUND

The present invention relates to aircraft lighting. It in particular relates to an exterior aircraft light unit and, more particularly, to an exterior aircraft light unit having multiple light sources.

Almost all aircraft are equipped with exterior light units. In particular, large passenger air planes are provided with a wide variety of exterior light units. The exterior light units are provided for a wide variety of different purposes, such as for allowing the passengers and/or air crew to view the outside, for passive visibility, for signaling purposes, etc. Examples of such exterior light units are navigation lights, also referred to as position lights, beacon lights, anti-collision lights, wing scan lights, landing lights, taxi lights, runway turn-off lights, etc.

Each of said exterior light units may comprise a plurality of light sources. When operated, the temperature of said light sources increases. The temperature of the light sources, in particular of LEDs, however, needs to be restricted to avoid damage of the light sources and to operate the light sources with good efficiency. Thus, often heat sinks are provided in thermal connection with the light sources for dissipating the heat generated by operating the light sources. Ideally, the heat sinks would be designed so that the thermal loads/temperatures of all light sources of an exterior light unit are the same in order to allow operating all light sources simultaneously with good efficiency. For practical reasons, such as the mounting position and/or the spatial orientation of the exterior light unit, the heat sinks are often not ideal in real life exterior light units, so that the thermal loads/temperatures of the light sources of an exterior light unit are not the same. As a result, not all light sources of the exterior light unit may be operated simultaneously with good efficiency.

It therefore would be beneficial to provide an exterior aircraft light unit, having a plurality of light sources, which allows for simultaneously operating all light sources at good thermal conditions.

SUMMARY

Exemplary embodiments of the invention include an exterior aircraft light unit that comprises at least two light sources, wherein each light source is provided with a variable current bypass component, electrically connected in parallel to the light source. Each variable current bypass component is configured to allow bypassing an adjustable electric current by the respective light source.

Controlling the variable current bypass components may allow for operating the light sources at beneficial or even optimal thermal operation points and prevent exceeding a predetermined threshold of the temperature. As a result, the light emissions of the light sources, in particular their intensities, may be achieved in an efficient manner at a low risk of damaging the light sources due to overheating. Also, a similar or even uniform aging of the light sources may be achieved.

According to an embodiment, the variable current bypass components are individually adjusted according to an expected thermal load of the respective light source. The variable current bypass components are in particular adjusted at the time of manufacture or installation of the exterior aircraft light unit and are kept constant at least up to the next maintenance of the exterior aircraft light unit or even over the whole life of the exterior aircraft light unit. In case the thermal loads of the individual lights sources are known or can be estimated well and remain constant over the lifetime of the exterior aircraft light unit, adjusting the variable current bypass components once or only at maintenance may be considered sufficient and may result in an exterior aircraft light unit which may be produced at low costs. The expected thermal load that is used for adjusting/setting the variable current bypass components may be a known thermal load or may be an estimated thermal load. The term expected thermal load relates to the operating temperature that a light source would reach in the absence of the variable current bypass component and may be the result of various factors, such as desired light output of the light source, available heat sinks, exposure to cooling air, etc.

According to an embodiment, the exterior aircraft light unit further comprises at least two temperature detectors and at least one control unit. Each temperature detector is configured for detecting the temperature of a respectively associated light source and for providing a corresponding temperature indicating signal. The at least one control unit is configured for controlling the variable current bypass components based on the temperature indicating signals provided by the temperature detectors. In such an embodiment, the variable current bypass components may be dynamically adjusted for operating the light sources at their respective beneficial operating points, without exceeding a predetermined threshold of the temperature, even under changing operating conditions, in particular changing thermal conditions.

According to an embodiment, the at least one control unit is configured for controlling the variable current bypass components in order to operate all light sources so that the temperature of each light source does not deviate more than 10%, in particular not more than 5%, from a reference temperature. In particular, the at least one control unit may be configured to operate all light sources so that the temperature of all light sources is substantially the same. The term temperature of the light sources refers to the temperature measured by the temperature detectors or inferred from the measurements of the temperature detectors. By operating the light sources at very similar or the same temperatures, very uniform thermal operating conditions and very uniform aging may be achieved. Also, an operating temperature allowing for efficient operation of the light sources may be uniformly achieved. The reference temperature may be a preset reference temperature or may be a reference temperature derived from operating the light sources at a nominal current, as described below, or may be any other kind of suitable reference temperature.

According to an embodiment, the control unit comprises a comparison unit, which is configured for comparing the temperature indicating signals provided by the temperature detectors with each other, and the control unit is configured to set the reference temperature on the basis of the comparison of the temperature indicating signals. In particular, the control unit may be configured to set the reference temperature to the value of the lowest temperature indicated by the temperature indicating signals. Further, the control unit may be configured to compare the temperature indicating signals when a nominal current is supplied to the light sources and to set the reference temperature on the basis of the comparison of the temperature indicating signals when the nominal current is supplied to the light sources. The setting of the reference temperature may be the result of and thus may be based on information about the actual operating conditions of the light sources. In particular, the reference temperature may be the result of a well-defined, repeatable procedure, namely the supply of a nominal current.

According to an embodiment, the at least two light sources are serially connected to a common power supply. Serially connecting the light sources to the power supply allows using a single electrical line for electrically connecting all light sources. It further ensures that the same electrical current is supplied to all the light sources. Also, one current source may be sufficient for supplying the light sources with current.

According to an embodiment, the control unit is configured for controlling the variable current bypass components of the light sources so that the respective temperatures of the light sources do not exceed a predetermined maximum temperature. This ensures that none of the light sources is overheated by supplying too much electrical power to the light sources.

According to an embodiment, the exterior aircraft light unit comprises an adjustable power supply for supplying electrical power to the at least two light sources. An adjustable power supply allows adjusting the electrical power supplied to the light sources according to momentary operating conditions. In particular, an adjustable power supply provides a second means of adjusting the current through the light sources and, thus, adjusting the temperatures of the light sources besides the variable current bypass components. For example, in operating situations where the temperature of one or more light sources is undesirably high despite diverting current through the variable current bypass components, the current may be further lowered via the adjustable power supply. The lowering of the current may be split up between the adjustable power supply and the variable current bypass components in a beneficial manner. Also, the adjustable power supply may be an efficient means of reaching a desirable operating point for the light sources. The adjustable power supply may in particular be an adjustable current source.

According to an embodiment, the control unit is configured for controlling the adjustable power supply based on the temperature indicating signals. The control unit in particular may be configured for controlling the adjustable power supply based on the light source having the lowest temperature. In this way, it may be achieved that the light source with the lowest temperature, which may be used as the reference temperature, as discussed above, is kept within acceptable temperature limits, which in turn may lead to all light sources being kept within acceptable temperature limits via above described mechanism of controlling the variable current bypass components. The overall heating of the exterior aircraft light unit may be kept within acceptable limits. The adjustable power supply may be employed for keeping the absolute temperature of the light sources under control, while the variable current bypass components may be employed for keeping the individual temperatures of the light sources at comparable or identical levels.

According to an embodiment, the light sources are or comprise LEDs. LEDs are reliable light sources having high efficiency, long lifetime, and low space requirements.

According to an embodiment, the temperature detectors are or include temperature sensitive elements, which are configured for directly detecting the temperature of the respective light source. Temperature sensitive elements allow for a direct detection of the temperatures at the light sources.

According to an embodiment, the temperature detectors are or include temperature determination elements, which are configured for determining the temperature of the respective light source indirectly from at least one other detected or measured parameter. Said parameters may include the flux generated by the respective light source or a current measured at the electrical connectors of the light source. This allows for a good proxy detection of the temperatures at the light sources without using temperature sensitive elements.

According to an embodiment, the each variable current bypass component includes at least one semiconductor element, e.g. a transistor, and/or at least one resistor, in particular an adjustable resistor, in order to allow adjusting the current flowing through the bypass.

The exterior aircraft light unit may be configured to be employed as at least one of a navigation light, a taxi light, a landing light, a takeoff light, a runway turn-off light, a cargo loading light, an anti-collision strobe light, an anti-collision beacon light, a logo light, a wing scan light, or an engine scan light. Due to the large amount of heat generated, the provision of variable current bypass components may be particularly useful in a taxi light, a landing light, a takeoff light, or a runway turn-off light. It is understood that above terms also include combined lights having one or more of the given functionalities. For example, the term landing light includes a combined landing, takeoff, and taxi light. For such combined lights, it is possible that, for each functionality, the light unit has above described structure of at least two light sources, at least two variable current bypass components, and a control unit controlling the variable current bypass components based on the temperatures of the at least two light sources.

Exemplary embodiments of the invention further include an aircraft, such as an airplane or a helicopter, comprising at least one exterior aircraft light unit, as described in any of the embodiments above. The additional features, modifications, and effects, described above with respect to the exterior aircraft light unit, apply to the aircraft in an analogous manner.

Exemplary embodiments of the invention further include a method of operating an exterior aircraft light unit, which comprises at least two light sources, each light source being provided with at least one variable current bypass component, which allows bypassing an adjustable current by the respective light source, the method comprising the steps of: detecting the temperature of each light source; and controlling the variable current bypass components based on the detected temperatures of the respectively associated light sources. The additional features, modifications, and effects, described above with respect to any of the embodiments of the exterior aircraft light unit, apply to the method of operating an exterior aircraft light unit in an analogous manner. The exterior aircraft light unit, operated by said method, may be in accordance with any of the embodiments described herein.

In an embodiment, the method includes the steps of: comparing the detected temperatures with each other; setting a reference temperature on the basis of the comparison of the detected temperatures; and controlling the variable current bypass components so that the temperature of each light source does not deviate more than 10%, in particular not more than 5%, from the reference temperature.

In an embodiment, the method includes controlling an adjustable power supply for supplying power to the at least two light sources. The method may in particular include controlling the adjustable power supply so that the coolest light source is operated generating a predetermined light flux or so that the coolest light source is operated for generating the maximum light flux possible without exceeding a predetermined maximum temperature.

BRIEF DESCRIPTION OF THE DRAWINGS

Exemplary embodiments of the invention are described in detail below with reference to the figures, wherein.

DETAILED DESCRIPTION

Figure 1:
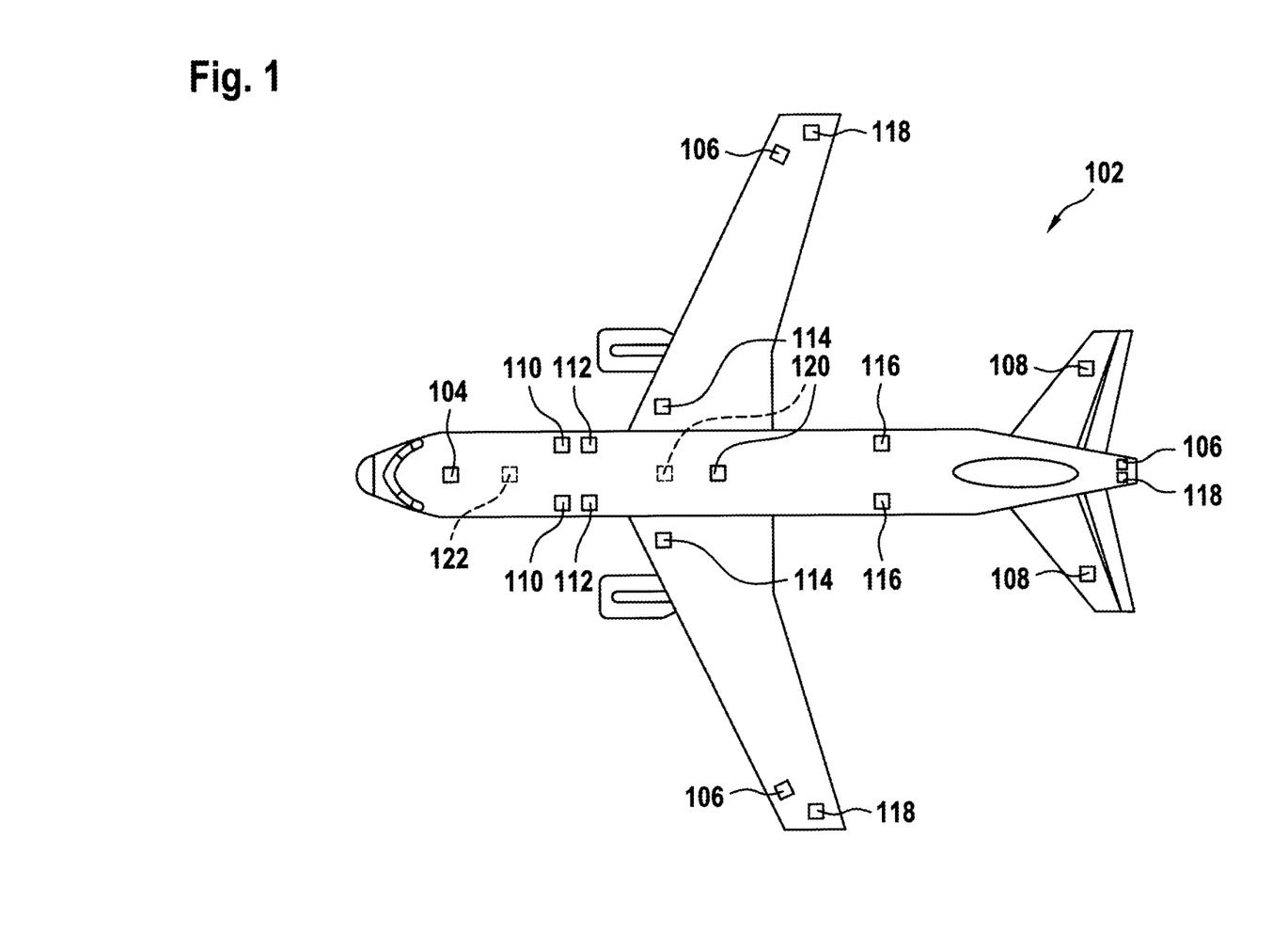
FIG. 1 depicts an aircraft in accordance with an exemplary embodiment of the invention, with potential locations for light units in accordance with exemplary embodiments of the invention being indicated.

FIG. 1 shows an aircraft 102 and various components of an exterior aircraft lighting system of the aircraft 102. In the exemplary embodiment of FIG. 1, the aircraft 102 is an airplane. The exterior aircraft lighting system comprises a lighting system control 104 and a variety of exterior lights. The lighting system control 104 is configured for controlling the exterior lights of the aircraft 102.

The aircraft 102 of FIG. 1 has a wide variety of exterior lights. In particular, the aircraft 102 has three navigation lights 106, two logo lights 108, two wing scan lights 110, two engine scan lights 112, two runway turnoff lights 114, two cargo loading lights 116, three anti-collision strobe lights 118, two anti-collision beacon lights 120, and a landing light 122. It is pointed out that these kinds of lights and their numbers are exemplary only and that the aircraft 102 may have additional lights that are not shown, such as taxi lights and take-off light, which may for example be provided at the same location as the landing light 122. It is also possible that the landing light 122 is a combined landing, taxi, and take-off light.

The three navigation lights 106 are positioned in the left and right wing tips as well as the tail of the aircraft 102. In normal flight conditions, each one of the navigation lights 106 emits light in one of the colors green, red and white, thus indicating to the aircraft environment if they are looking at the port side, starboard side or tail side of the aircraft. The navigation lights are normally on during all phases of the flight and in all flight conditions.

The logo lights 108 are directed to the vertical stabiliser of the aircraft 102 and are provided for illuminating the same, in particular for illuminating the logo commonly provided on the vertical stabiliser. The logo lights 108 are normally switched on for the entire duration of the flight during night flights. It is also possible that the logo lights are only used during taxing on the airport and are normally switched off during the flight.

The wing scan lights 110 and the engine scan lights 112 are positioned on the left and right sides of the aircraft fuselage, in front of the roots of the wings of the aircraft 102. The wing scan lights 110 and the engine scan lights 112 are normally off during the flight and may be switched on periodically or upon reasonable cause by the pilots or by the aircrew, in order to check the wings and the engines of the aircraft 102. The runway turnoff lights 114 are positioned in the roots of the wings. They are directed forwards and are normally switched off during the flight and switched on during taxiing, at least at night. The cargo loading lights 116 are positioned on the left and right sides of the aircraft fuselage, behind the wings and in front of tail structure of the aircraft 102. They are normally switched off during the flight of the aircraft 102.

The anti-collision strobe lights 118 are positioned in the left and right wing tips as well as at the tail of the aircraft 102. The anti-collision strobe lights 118 emit respective sequences of light flashes during normal operation of the aircraft 102. It is also possible that the anti-collision strobe lights 118 are only operated during night and bad weather conditions. The anti-collision beacon lights are positioned on the top and the bottom of the fuselage of the aircraft 102. They are arranged at the height of the wings in the longitudinal direction of the aircraft 102. While one of the anti-collision beacon lights 120 is disposed on the top of the fuselage, the other one of the anti-collision beacon lights 120 is disposed on the bottom of the fuselage and is therefore shown in phantom. The anti-collision beacon lights 120 are normally switched on during taxiing and during take-off and landing. Their output is perceived as a sequence of red light flashes in a given viewing direction.

The landing light 122 is attached to the front running gear of the aircraft 102, which is normally stored within the fuselage and is deployed during landing, taxiing and take off. As the landing light 122 is also arranged on the bottom of the aircraft 102, it is also shown in phantom. As pointed out above, it is understood that the landing light 122 may be a combined landing, taxi, and take-off light, having different light outputs for the different phases of landing, taxi, and take-off.

Figure 2:
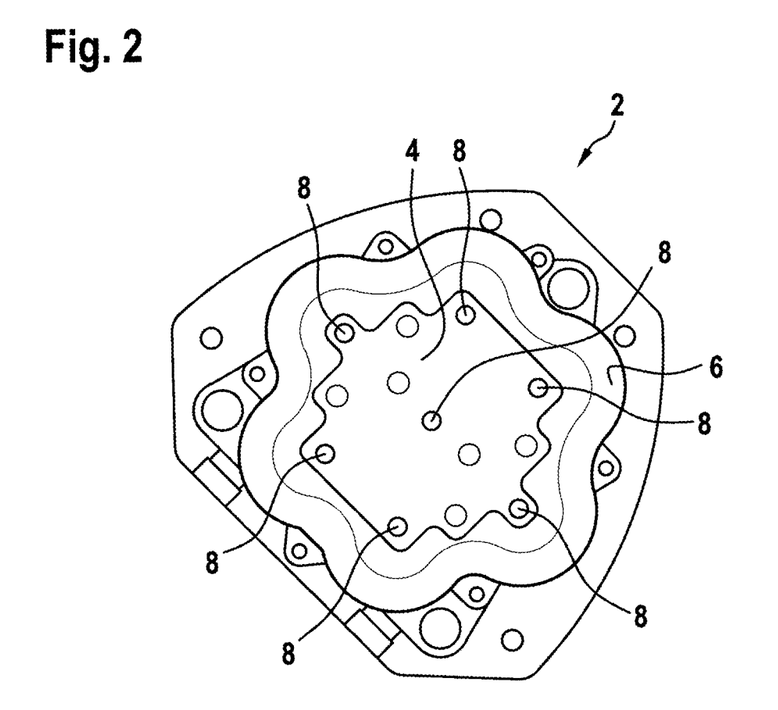
FIG. 2 depicts a top view of an exterior aircraft light unit in accordance with an exemplary embodiment of the invention.

FIG. 2 depicts a top view of an exterior aircraft light unit 2 according to an exemplary embodiment of the invention. The light unit 2 comprises a support plate 4, for example a printed circuit board, supporting a plurality of light sources 8. The light sources 8 are surrounded by a common reflector 6, which is configured for reflecting the light emitted by the light sources 8. The exterior aircraft light unit 2 is covered by an at least partially transparent cover, which is not shown in FIG. 2. The at least partially transparent cover may include an optical system for shaping the light emitted by the exterior aircraft light unit 2.

The light unit 2 may be used for any of the lights described above with respect to FIG. 1. The shape of the housing and the cover may be adapted to the particular position and attachment structure of the individual light unit 2. Also, depending on the desired light intensity for a given light unit 2, the light units 2 may have different numbers of light sources 8, reflectors 6 and/or multiple lens structures. In general, the optical system of the light unit in question, e.g. the reflector(s) and/or lens(es) and/or shutter(s), may be adapted to the particular requirements/design objectives of the light unit in question. Light units 2 according to exemplary embodiments of the invention also may be employed in other aircraft, such as helicopters (not shown).

Electrical current is supplied to the light sources 8 from a common power supply 10 (see FIGS. 3 and 4), which is not shown in FIG. 2. In the exemplary embodiments of the Figs., the light sources 8 are connected in series with the power supply, and the same electrical current is supplied to all light sources 8. Due to different thermal environments and/or manufacturing tolerances of the light sources 8, the temperatures of the light sources 8 may differ even when operated with the same electrical current.

When exposed to excessive heat, light sources 8, in particular light sources 8 which are or comprise LEDs, age and are likely to fail in an exponential fashion. On the other hand, if all light sources 8 were to be operated with a low electrical current, which is low enough to reliably avoid overheating of all light sources 8, some of the light sources 8 would be operated below their optimal operating point, without being in danger of overheating, and thus the light flux emitted by the exterior aircraft light unit 2 would be smaller than possible.

According to an exemplary embodiment of the invention, the current flowing through each of the light sources 8 is controlled individually for each of the light sources 8. The details are described in the following with respect to FIGS. 3 and 4.

Figure 3:
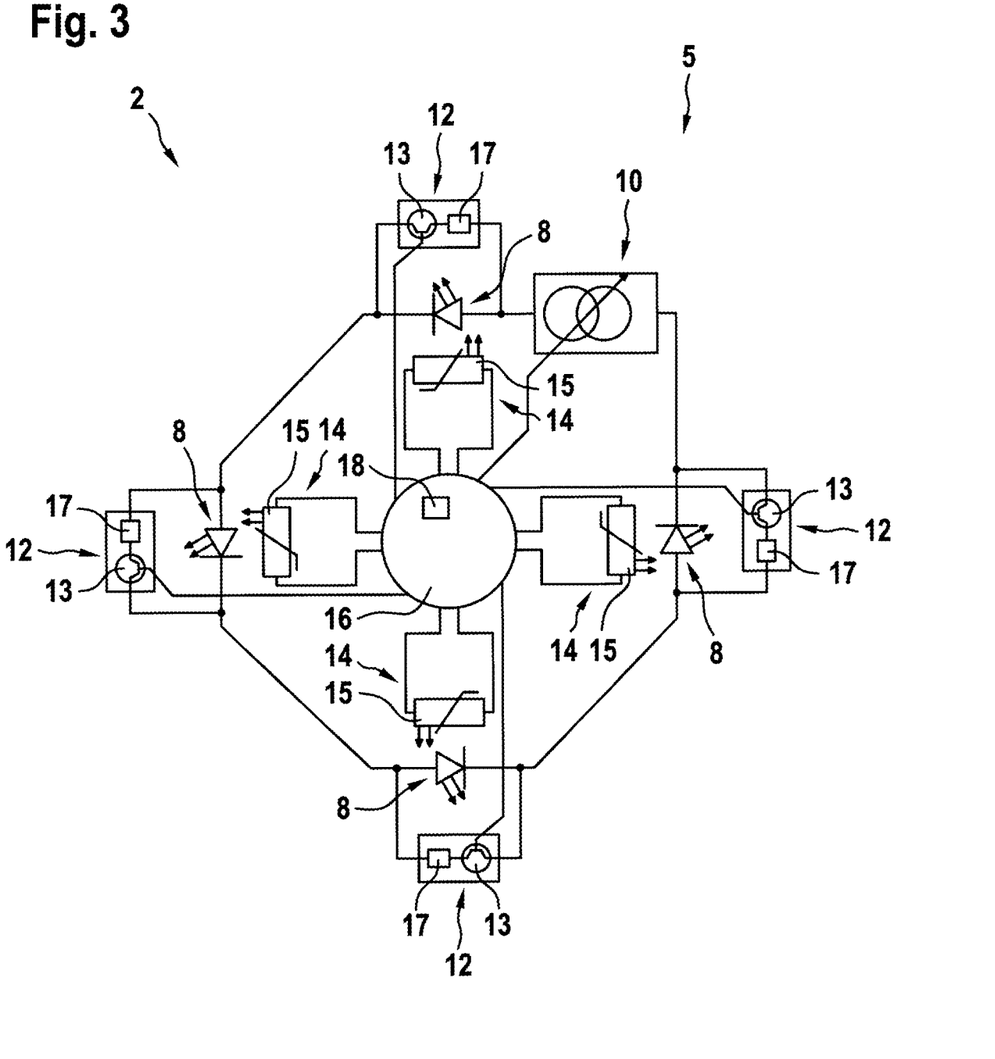
FIG. 3 shows a circuit diagram of an exterior aircraft light unit in accordance with an exemplary embodiment of the invention.

FIG. 3 shows a circuit diagram 5 of an exterior aircraft light unit 2 according to an exemplary embodiment of the invention.

The exterior aircraft light unit 2, schematically illustrated in FIG. 3, comprises four light sources 8, in particular four LEDs, and a common power supply 10, which is configured for supplying electrical power to the light sources 8. The common power supply 10 in particular is an adjustable power supply 10 supplying an adjustable electrical current to the light sources 8.

Although four light sources 8 are shown in FIG. 2, the skilled person will understand that the present invention may be applied to any exterior aircraft light unit 2 comprising two or more light sources 8. In the embodiment shown in FIG. 3, the light sources 8 are serially connected to the common power supply 10. In an alternative configuration, which is not shown in the figures, the light sources 8 may be connected to the common power supply 10 in parallel. It is also possible that the light sources are arranged in a combined parallel and series arrangement, e.g. the exterior aircraft light unit 2 may have a plurality of light source strands, each strand having a series connection of light sources and the strands being arranged in parallel.

Each light source 8 is provided with a variable current bypass component 12, which is electrically connected in parallel to the light source 8. The variable current bypass component 12 allows bypassing a portion of the electrical current supplied by the power supply 10 by the respective light source 8. In other words, a portion of the current supplied by the power supply 10 towards the respective light source 8 may be diverted around the respective light source 8 by the associated variable current bypass component 12. The variable current bypass component 12 allows to divert an adjustable amount of current around the respective light source 8.

By individually bypassing a portion of the electrical current supplied by the power supply 10, the temperature of each light source 8 may be adjusted individually. In particular, overheating of any of the light sources 8 may be reliably prevented by bypassing a sufficient amount of electrical current by the respective light source 8.

Figure 4:
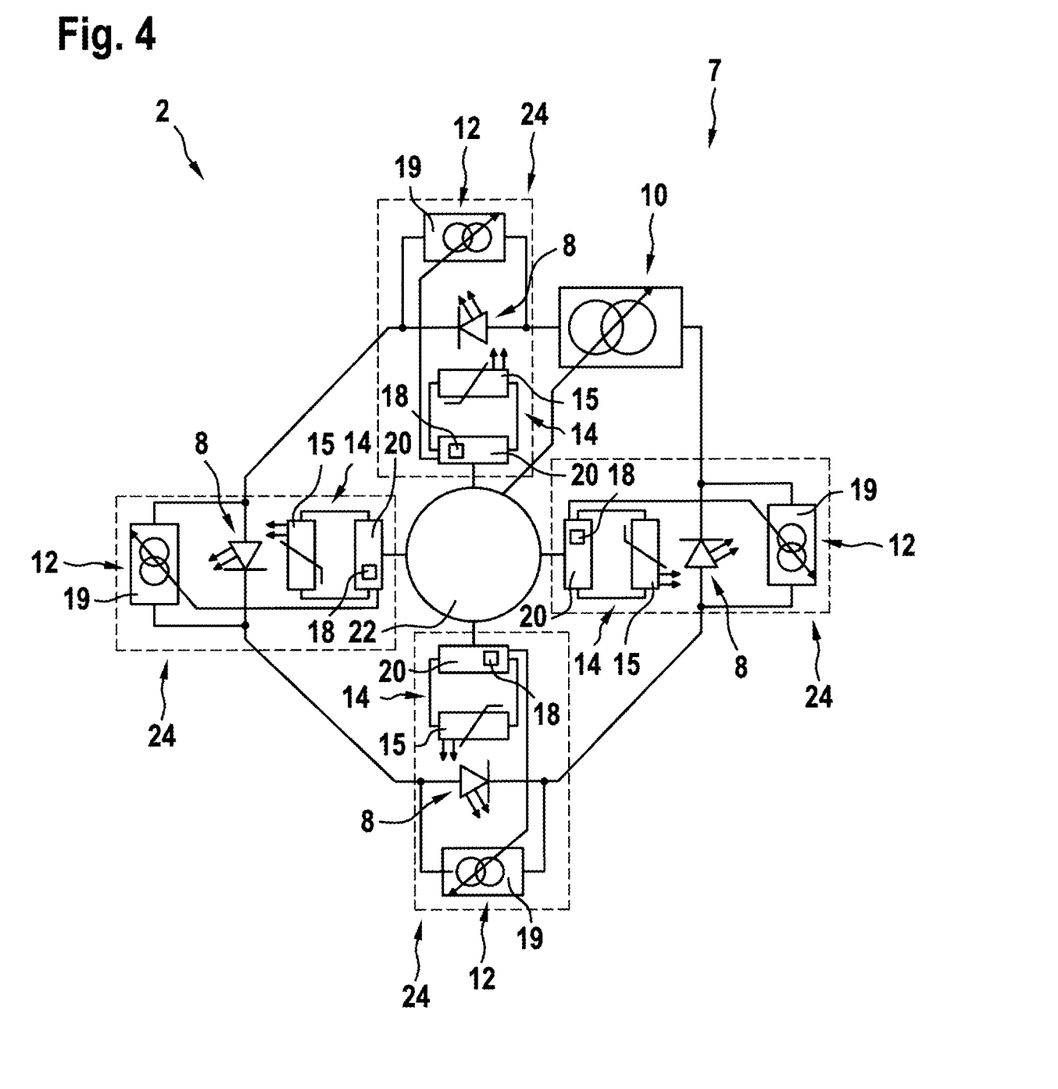
FIG. 4 shows a circuit diagram of an exterior aircraft light unit in accordance with another exemplary embodiment of the invention.

Each of the variable current bypass components 12 may comprise a combination of a semiconductor element 13, such as a transistor, and a fixed resistor 17 or an adjustable resistor 19 (see FIG. 4). By setting the resistance of the semiconductor element 13 or the adjustable resistor 19 via an according control thereof, the amount of current through the variable current bypass component 12 may be adjusted. In this way, the current through the associated light source 8 may be adjusted as well.

If the thermal load of each of the light sources 8 in operation is known and considered as being constant, the variable current bypass components 12 may be adjusted once after manufacturing, installing and/or maintaining the exterior aircraft light unit 2, in order to remain constant over the lifetime or at least over the maintenance interval of the exterior aircraft light unit 2. In this case, each variable current bypass component 12 is adjusted individually so that each variable current bypass component 12 bypasses a constant portion of the electrical current, said portion being adjusted individually to each of the light sources 8. Different thermal loads of the lights sources 8 caused by different installation positions and/or orientations may be taken into account by adjusting the variable current bypass components 12 accordingly.

Alternatively, as it is illustrated in FIGS. 3 and 4, the variable current bypass components 12 may be adjusted dynamically during the operation of the exterior aircraft light unit 2. The variable current bypass components 12 in particular may be adjusted dynamically based on the actual temperature of each of the light sources 8.

In order to allow for determining the actual temperatures of the light sources 8, a temperature detector 14 is associated with each of the light sources 8. The temperature detector 14 may be or include a temperature sensitive element (temperature sensor) 15, which is configured for directly detecting (measuring) the temperature of or close to the associated light source 8. Alternatively or additionally, the temperature detector 14 may be or include a temperature determination element 15, which is configured for determining the actual temperature indirectly, e.g. from the light emission generated by the respective light source 8, the current at the respective light source 8 or similar parameters.

In the embodiment shown in FIG. 3, a central control unit 16 is provided. The central control unit 16 is connected to the temperature detectors 14 and configured for adjusting each of the variable current bypass components 12 based on the temperatures determined by the temperature detectors 14. The temperature detectors 14 convey the temperatures of the light source 8 to the central control unit 16 via respective temperature indicating signals. In case the power supply 10 is an adjustable power supply 10, as it is shown in FIG. 3, the control unit 16 may be configured for additionally controlling the adjustable power supply 10, as will be explained below.

The control unit 16 in particular may comprise a comparison unit 18, which is configured for comparing the temperatures of all light sources 8. The control unit 16 is further configured adjusting both the adjustable power supply 10 and the variable current bypass components 12, thus adjusting the current through the light sources 8 via two mechanisms.

The operation of the exterior aircraft light unit 2 is described as follows. When starting the exterior aircraft light unit 2, the adjustable power supply 10 is controlled to supply a nominal supply current, and the variable current bypass components 12 are controlled not to bypass any current by the light sources 8. Hence, the nominal supply current is provided to all light sources 8. In this operation scenario, the temperature of each light source 8 is detected by the respective temperature detectors 14, and according temperature indicating signals are provided to the comparison unit 18. The comparison unit 18 compares the detected temperatures to each other and determines the lowest temperature. The light source, having the lowest temperature, is set as the reference light source, and the lowest temperature is set as the reference temperature. The control unit 16 controls the variable current bypass component of the reference light source to not divert any current therethrough. Further, the control unit 16 controls each of the other variable current bypass components to divert such an amount of current therethrough that the temperature of the respectively associated light source is substantially the same as the reference temperature. For this control, the light sources 8, the temperature detectors 14, the control unit 16, and the variable current bypass components 12 form respective closed feedback loops for each light source. In this way, the control unit 16 ensures that the light sources 8 are operated at substantially the same temperature, preventing overheating of individual light sources 8 and ensuring a uniform aging of the individual light sources 8.

During continued operation, the light sources 8 may heat up, for example due to heat being trapped within the exterior aircraft light unit 2 or due to the heat sinks of the individual light sources 8 not being able to transfer all heat away from the light sources 8 over an extended period of time. Two options for dealing with such an operating temperature increase over time are described as follows. In a first option, the control unit 16 may keep the reference temperature constant, i.e. the control unit 16 may keep the reference temperature as determined at or shortly after start-up of the exterior aircraft light unit 2. In this case, the control unit 16 counteracts the heating up of the light sources by diverting more current around the light sources through the variable current bypass components 12. In this way, the operating temperature of the light sources 8 may be kept at the same reference temperature, but the light output of the exterior aircraft light unit 2 may go down. In a second option, the control unit 16 keeps monitoring the reference light source, i.e. the light source having the lowest temperature when supplied with nominal supply current, and repeatedly, periodically and/or constantly sets the reference temperature to the momentary operating temperature of the reference light source. Further, the control unit 16 keeps controlling the variable current bypass components of the other light sources in such a way that all light sources 8 are operated at the adjusted reference temperature. In this way, an overall increasing operating temperature is accepted, but uniformity in operating temperature among the light sources 8 may be ensured. Also, by accepting an overall increasing operating temperature, the light output is kept high.

As stated above, the control unit 16 also controls the power supplied by the adjustable power supply 10. In particular, the control unit 16 controls the current supplied by the adjustable power supply 10. Adjusting the current supplied by the adjustable power supply 10 is an efficient means of counteracting an increasing temperature over time. In the particular example described above, where a temperature increase of the reference light source is accepted, controlling the adjustable power supply 10 can be used for keeping the operating temperature below a predetermined maximum temperature. In particular, the control unit 16 may be configured to monitor the temperature of the reference light source and to decrease the current supplied by the adjustable power supply 10, if the temperature of the reference light source approaches or reaches the predetermined maximum temperature. In this way, the adjustable power supply 10 provides for an additional level of overheating protection. In particular, the adjustable power supply 10 allows for accepting an increase in operating temperature for maintaining a high light output, while ensuring that countermeasures are taken before/when overheating occurs. An overall favorable compromise between high light output, uniform thermal load among the light sources, and effective protection against overheating may be achieved. It is pointed out that it is also possible to provide for an effective protection against overheating with the variable current bypass components without the adjustable current source, for example by restricting the reference temperature to values below and up to the predetermined maximum temperature.

FIG. 4 shows a circuit diagram 7 of an exterior aircraft light unit 2 according to an alternative exemplary embodiment of the invention. The exterior aircraft light unit 2 of FIG. 4 is similar to the exterior aircraft light unit 2 of FIG. 3. Like or similar elements are denoted with like reference numerals, and reference is made to the description of FIG. 3 above. The following description mainly deals with the differences between the embodiments of FIG. 3 and FIG. 4.

In the alternative embodiment of FIG. 4, an individual control unit 20 is associated with each of the light sources 8 and the corresponding temperature detectors 14. Each individual control unit 20 adjusts the variable current bypass component 12, bypassing its associated light source 8, based on a signal provided by the corresponding temperature detector 14. Thus, the variable current bypass components 12 are controlled autonomously by the individual control units 20 preventing an overheating of each of the light sources 8. The individual control units 20 may be configured to control the respective variable current bypass components 12 such that the temperatures of the associated light sources are below a predetermined maximum temperature or such that the temperatures of the associated light sources are substantially at a reference temperature or in any other suitable way.

The individual control units 20 may be connected with each other or with a central master control unit 22 in order to exchange data, in particular data with respect to the detected temperatures. The central master control unit 22 in particular may be configured for controlling the variable power supply 10 based on the data provided by the individual control units 20. The central master control unit 22 may also be configured to provide a reference temperature to the individual control units 20.

The individual control units 20 may be integrated with the corresponding variable current bypass components 12 and temperature detectors 14 for providing integrated bypass modules.

In a further embodiment, the light sources 8 may be integrated with the respective bypass modules forming autonomous light modules 24. Such autonomous light modules 24 may be employed instead of conventional light sources 8. Each light module 24 autonomously prevents overheating of its light source 8 and may allow operating the light source 8 at a desired operating point.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light unit comprising:
   at least two light sources;
   at least two temperature detectors; and
   at least one control unit,
   wherein each light source is provided with a variable current bypass component which is configured to allow bypassing an adjustable electric current by the respective light source,
   wherein one of the temperature detectors is associated with each of the light sources, respectively, and configured for detecting the temperature of the respectively associated light source and for providing a corresponding temperature indicating signal;
   wherein the at least one control unit comprises a comparison unit, which is configured for comparing the temperature indicating signals which each other and determining the light source having the lowest temperature, which is set as a reference temperature; and
   wherein the at least one control unit is configured for controlling the variable current bypass components based on the temperature indicating signals provided by the temperature detectors so that the temperature of each light source does not deviate more than 10% from said reference temperature.

2. The exterior aircraft light unit according to claim 1, wherein the at least one control unit is configured for controlling the variable current bypass components in order to operate all light sources so that the temperature of each light source does not deviate more than 5% from a reference temperature.

3. The exterior aircraft light unit according to claim 1, wherein the control unit is configured for controlling the variable current bypass components of the light sources so that the respective temperatures of the light sources do not exceed a predetermined maximum temperature.

4. The exterior aircraft light unit according to claim 3, further comprising an adjustable power supply which is configured for supplying electrical power to the at least two light sources, wherein the at least one control unit is configured for controlling the adjustable power supply based on the temperature indicating signals.

5. The exterior aircraft light unit according to claim 1, wherein the temperature detectors are temperature sensitive elements or include temperature sensitive elements, which are configured for directly detecting the temperature of the respective light source, and
   wherein the temperature detectors are temperature determination elements or include temperature determination elements, which are configured for determining the temperature of the respective light source indirectly from at least one other detected or measured parameter, wherein said parameter in particular includes the flux generated by the respective light source.

6. The exterior aircraft light unit according to claim 1, wherein the at least two light sources are serially connected to a common power supply.

7. The exterior aircraft light unit according to claim 1, wherein the light sources are LEDs or comprise LEDs.

8. The exterior aircraft light unit according to claim 1, wherein each variable current bypass component includes at least one transistor or at least one adjustable resistor.

9. The exterior aircraft light unit according to claim 1, wherein the exterior aircraft light unit is configured to be employed as at least one of a navigation light, a taxi light, a landing light, a takeoff light, and a runway turn-off light, a cargo loading light, an anti-collision strobe light, an anti-collision beacon light, a logo light, a wing scan light, or an engine scan light.

10. An aircraft comprising at least one exterior aircraft light unit according to claim 1.

11. A method of operating an exterior aircraft light unit comprising at least two light sources, each light source being provided with at least one variable current bypass component, which allows bypassing an adjustable current by the respective light source;
    wherein the method includes:
    detecting the temperature of each light source;
    comparing the detected temperatures with each other and determining the lowest detected temperature;
    setting the lowest detected temperature as a reference temperature; and
    controlling the variable current bypass components so that the temperature of each light source does not deviate more than 10% from the reference temperature.

12. The method according to claim 11, wherein the variable current bypass components is controlled so that the temperature of each light source does not deviate more than 5% from the reference temperature.

* * * * *